United States Patent

Yamamoto et al.

[11] Patent Number: 4,941,319
[45] Date of Patent: Jul. 17, 1990

[54] ENGINE CONTROL DEVICE

[75] Inventors: Hitoshi Yamamoto; Takumi Tottori; Masayuki Toriyama, all of Saitama, Japan

[73] Assignee: Honda Giken Kogyo Kabushiki Kaisha, Tokyo, Japan

[21] Appl. No.: 251,593

[22] Filed: Sep. 29, 1988

[30] Foreign Application Priority Data

Sep. 30, 1987 [JP] Japan .................. 62-247678
Oct. 5, 1987 [JP] Japan .................. 62-251107

[51] Int. Cl.⁵ ............................... F02B 27/02
[52] U.S. Cl. ........................... 60/314; 60/312
[58] Field of Search ..................... 60/312, 314

[56] References Cited

U.S. PATENT DOCUMENTS 3,703,937 11/1972 Tenney .
3,726,092 4/1973 Raczuk .................... 60/314
4,289,108 9/1981 Shioyama .

FOREIGN PATENT DOCUMENTS

4722045 7/1972 Japan .
587060 2/1983 Japan .
62-85116 4/1987 Japan .
62-218616 9/1987 Japan .
63-51117 4/1988 Japan .

Primary Examiner—Douglas Hart
Attorney, Agent, or Firm—Lyon & Lyon

[57] ABSTRACT

An engine controller is linked to and controls simultaneously both an exhaust control valve and an on-off valves or changeover valves or a reflector in the exhaust pipe to improve engine performance. The controller positions the exhaust control valve and on-off valves or changeover valves, or reflector based upon detected engine speed and throttle position.

16 Claims, 8 Drawing Sheets fig. 1.

ENGINE CONTROL DEVICE

BACKGROUND OF THE INVENTION

The field of the present invention is engine controllers.

Engines, and specifically internal combustion engines, may be provided with intake and exhaust systems having various controls. These controls are generally operated by individual central processors or controllers. Having individual central processors for controlling the operation of each intake or exhaust system control, however, results in high costs and also creates complicated adjustment operations.

SUMMARY OF THE INVENTION

The present invention is directed to an engine control apparatus which controls the operation of a plurality of intake or exhaust system controls with a central processor, thereby achieving cost reduction and simplification of adjustment operations. Other and further objects and advantages will appear hereinafter.

BRIEF DESCRIPTION OF THE DRAWINGS

In the drawings wherein similar reference characters denote similar elements throughout the central views.

DETAILED DESCRIPTION OF THE PREFERRED EMBODIMENT

Figure 1:
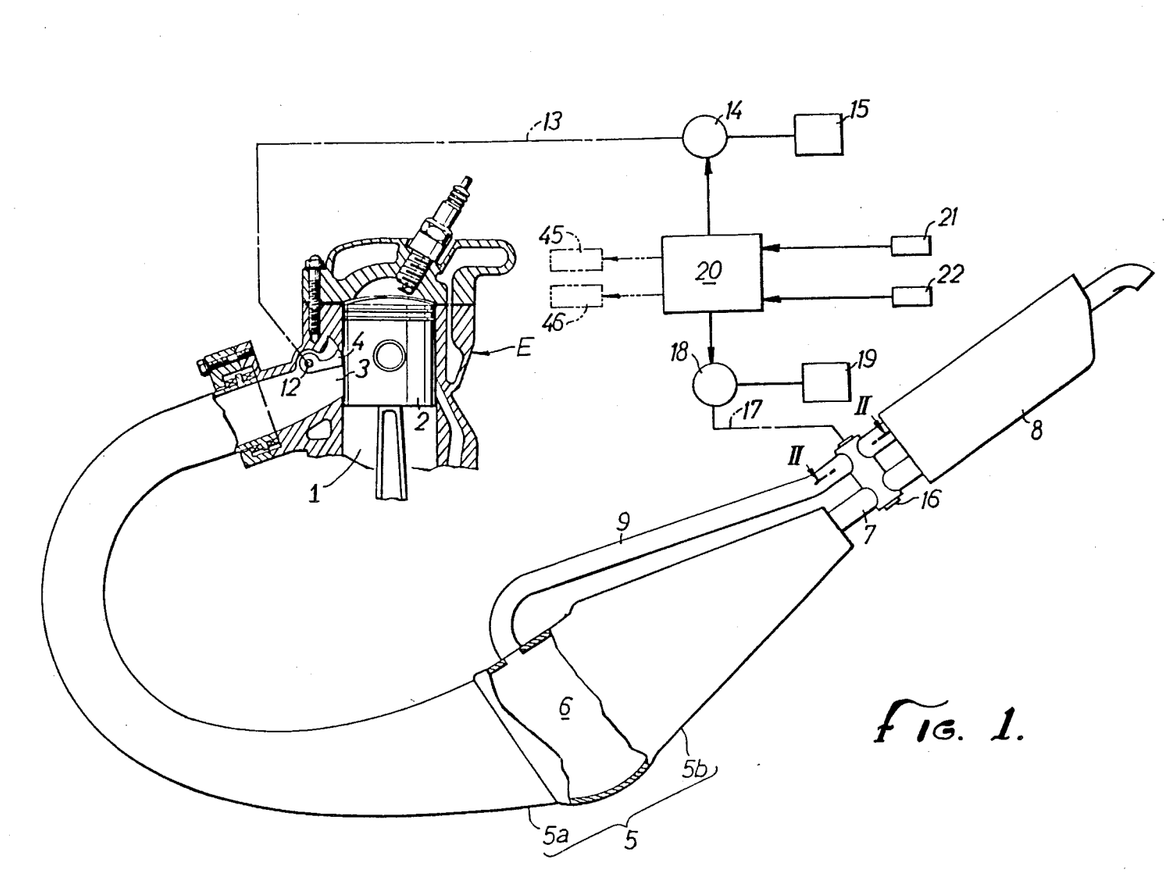
FIG. 1 is a schematic view of the present engine control apparatus.

Turning now to the appended drawings, as shown in FIG. 1, an exhaust port 3 is opened and closed by a piston 2 slidably fitted within a cylinder 1 of a two-cycle engine, which may be mounted on a motorcycle. The exhaust port 3 is open to the inside surface of the cylinder 1. An exhaust control valve 4 is disposed generally above the exhaust port to control the opening and closing timing of the exhaust port 3. An exhaust pipe 5 is connected to the exhaust port 3. The exhaust pipe 5 includes a first section 5a having an expanded downstream end and a second section 5b in the form of a truncated cone with the larger diameter end thereof connected to the downstream end of the first exhaust pipe section 5a. In the downstream end of the first exhaust pipe section 5a and the second exhaust pipe section 5b is provided an expanded chamber 6. This chamber is connected to a muffler 8 through a main tailpipe 7. A sub tail pipe 9 has an upstream end connected to the second exhaust pipe section 5b and opens into the central part of the chamber 6. The downstream end of the sub tail pipe 9 is also connected to the muffler 8. Towards the middle of the main tailpipe 7 and the sub tail pipe 9, there are provided changeover control valves 10, 11 as second and third control elements or control operating means, the exhaust control valve being the first control operating means. (See FIG. 2).

The control valve 4 disposed in the exhaust port 3 is installed on a drive shaft 12 which is rotatably disposed alongside the cylinder 1. The drive shaft 12 is coupled to a servo motor 14 which acts as a driving source for the exhaust valve 4 through a power transmission mechanism 13, preferably comprising a pulley and a drive belt. The servo motor 14 includes a potentiometer 15 for detecting the position or the amount of operational movement of the servo motor 14, which corresponds to the amount of opening of the exhaust control valve 4.

With reference to FIG. 2, the change over control valves 10, 11 are secured on a common drive shaft 16 which is rotatably mounted through the main and sub tail pipes 7 and 9. The drive shaft 16 is coupled to a servo motor 18 to provide a driving source, through a power transmission 17, preferably comprising a pulley and drive belt. (See FIG. 1). The servo motor 18 includes a potentiometer 19 for detecting the position or amount of movement of the servo motor 18 which corresponds to the amount of opening of the changeover control valves 10, 11. The changeover control valves 10, 11 are arranged at different mounting angles in relation to the drive shaft 16, such that the amount of opening in the main and sub tail pipes 7 and 9 varies with the rotation of the drive shaft 16. Both servo motors 14 and 18 are connected to a common central processor 20. Detected values from an engine speed detector 21 and a throttle opening detector 22 are input to the central processor 20.

Figure 3:
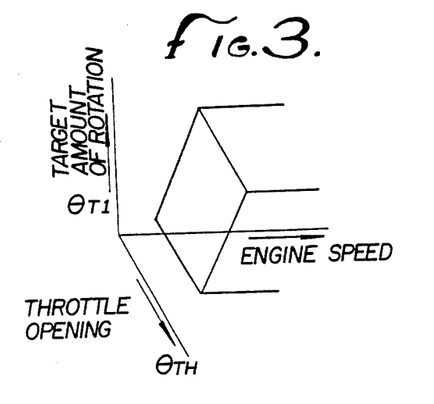
FIG. 3 is a graph illustrating the target amount of rotation of the control valve drive shaft illustrated in FIG. 2.
Figure 4:
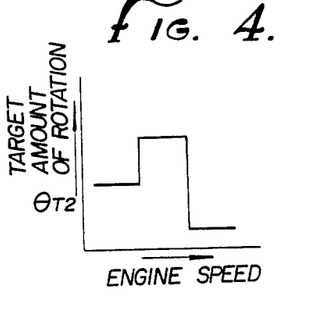
FIG. 4 is a graph illustrating the target amount of rotation of a drive shaft of a changeover control valve.

Referring to FIG. 3, the target opening of the control valve 4, i.e., the target amount of rotation $\theta t_1$ of the drive shaft 12 corresponding to the engine speed Ne and the throttle opening $\theta$th are set within the central processor unit 20. Simultaneously, the target amount of rotation $\theta t_2$ of the drive shaft 16 corresponding to the engine speed Ne is set as shown in FIG. 4.

Figure 2A:
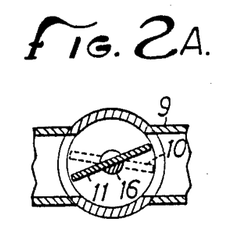
FIG. 2 is a section view taken along line II—II of FIG. 1.
Figure 2B:
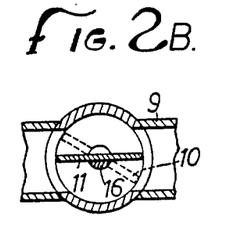
Figure 2C:
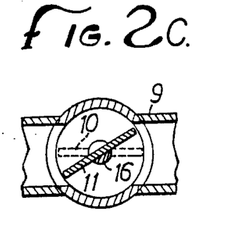

In particular, the amount of rotation of the drive shaft 16 is set such that at a low engine speed Ne, both the changeover control valve 11 in the sub tail pipe 9 and the changeover control valve 10 in the main tailpipe open slightly as shown in FIG. 2(a). The amount of rotation of the drive shaft 16 is set such that at a medium engine speed Ne, the changeover control valve 11 in the sub tail pipe 9 is wide open while the changeover control valve 10 in the main tailpipe is just slightly open as shown in FIG. 2(b). At a high engine speed Ne, the amount of rotation of the drive shaft 16 is set such that the changeover control valve 11 in the sub tail pipe 9 is only slightly open while the changeover control valve 10 in the main tailpipe is wide open, as shown in FIG. 2(c).

Figure 5:
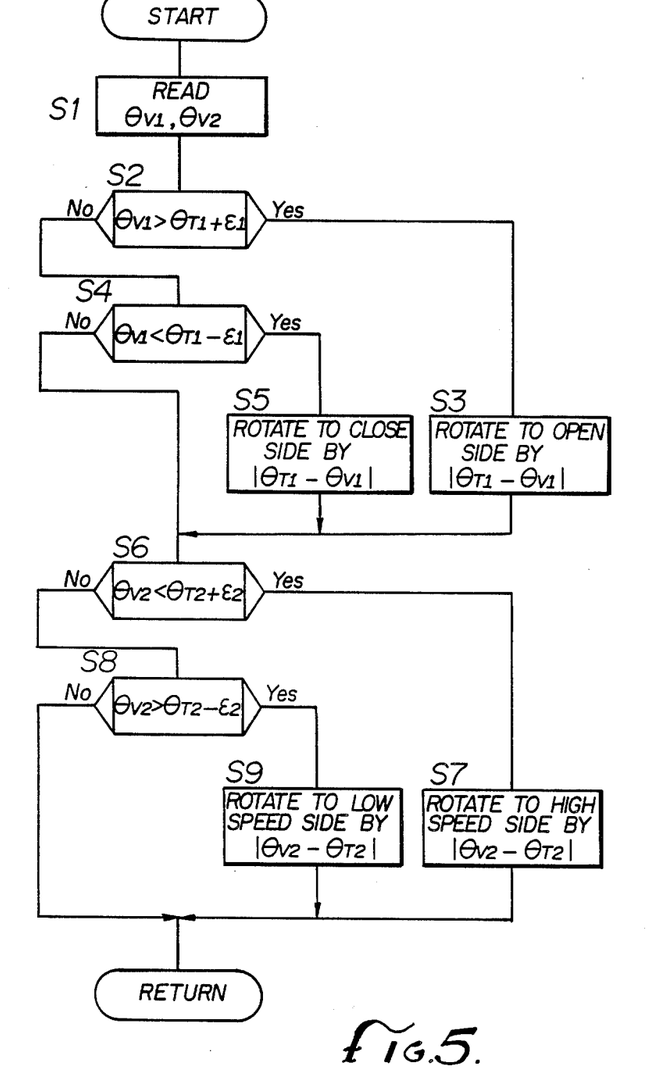
FIG. 5 is a flow chart illustrating the control procedure of a main program of the central processor illustrated in FIG. 1.
Figure 6:
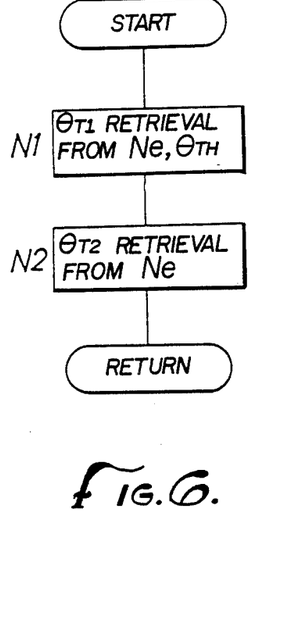
FIG. 6 is a flow chart illustrating a control procedure of an interruption subprogram of the central processor.

At the central processor 20, control is carried out in accordance with a main routine shown in FIG. 5 and an interruption subroutine shown in FIG. 6. First, in the main routine shown in FIG. 5, the amount of rotation $\theta v_1$, $\theta v_2$, of the drive shafts 12, 16 are read by potentiometer 15, 19 at a first step S1. Next, at a second step S2, whether $\theta v_1 > \theta t_1 + \epsilon_1$ is judged; when $\theta v_1 > \theta t_1 + \epsilon_1$, the drive shaft 12 is turned to drive the control valve 4 to the OPEN side by $|\theta t_1 - \theta v_1|$ at a third step S3; and when $\theta v_1 \leq \theta t_1 + \epsilon_1$, at the second step S2, the control proceeds to a fourth step S4, at which whether $\theta v_1 < \theta t_1 - \epsilon_1$ is judged. Furthermore, when $\theta v_1 < \theta t_1 - \epsilon_1$ is judged at the fourth step S4, the control proceeds to a fifth step S5, at which the drive shaft 12 is turned to drive the control valve to the CLOSE side by $|\theta t_1 - \theta v_1|$. That is, from the second step S2 to the fifth step S5, the amount of rotation of the drive shaft 12 is controlled such that the amount of rotation $\theta v_1$ of the drive shaft 12 will come within $\pm \epsilon_1$ of the target amount of rotation $\theta t_1$.

When $\theta v_1 \geq \theta t_1 - \epsilon_1$ at the fourth step S4, process at the third and fifth step S3 and S5 is finished, the operation proceeds to a sixth process S6, at which whether $\theta v_2 < \theta t_2 + \epsilon_2$ is judged. If $\theta v_2 < \theta t_2 + \epsilon_2$, the drive shaft 16 is driven to the HIGH SPEED OPERATION side by $|\theta v_2 - \theta t_2|$ at a seventh step S7. When $\theta v_2 > \theta t_2$ at the sixth step S6, the operation proceeds to an eighth step S8, at which whether $\theta v_2 > \theta t_2 - \epsilon_2$ is judged. When $\theta v_2 > \theta t_2 - \epsilon_2$ has been decided at the eighth step S8, the operation proceeds to a ninth step S9, at which the drive shaft 16 is driven to the LOW SPEED side by $|\theta v_2 - \theta t_2|$. Namely, from the sixth step S6 to the ninth step S9, the amount of rotation of the drive shaft 16 is controlled so that the amount of rotation $\theta v_2$ of the drive shaft 16 will come within $\pm \epsilon_2$ of the target amount or rotation $\theta t_2$.

When $\theta v_2 \leq \theta t_2 - \epsilon_2$ at the eighth step S8, and when the process at the seventh and ninth steps S7 and S9 is finished, the operation goes back to the first step S1.

The interruption subroutine in FIG. 6 interrupts the operation the aforementioned main routine at fixed intervals of time. At the first step N1, the target amount of rotation $\theta t_2$ of the rotating shaft 12 is retrieved on the basis of the engine speed Ne and the throttle opening $\theta$th. At the second step N2 the target amount of rotation $\theta t_2$ of the rotating shaft 16 is retrieved on the basis of the engine speed Ne.

Figure 7:
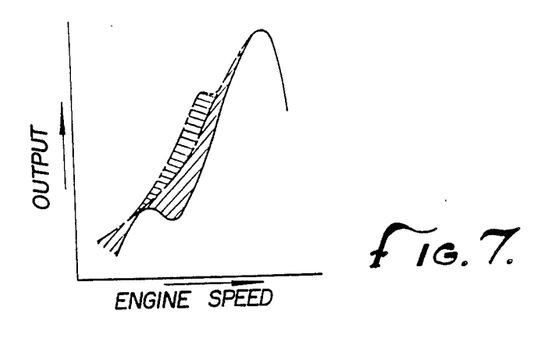
FIG. 7 is a graph illustrating engine output characteristics.

In the two-cycle engine E, controlling the opening of the control valve 4 in accordance with engine speed and throttle opening can increase the output of the engine E as shown by leftward descending oblique lines in FIG. 7. Also, controlling the opening of the changeover control valves 10, 11 in accordance with the engine speed can increase the output of the two-cycle engine E as shown by rightward descending oblique lines in FIG. 7. That is, since in a medium speed operation range of the two-cycle engine E, the opening of the changeover control valve 11 in the sub tail pipe 9 increases while the opening of the changeover control valve 10 in the main tail pipe decreases, stagnation of exhaust gas occurs in the expanded chamber 6 at the rear of the connection port of the sub tail pipe 9, thereby resulting in a temperature drop in the expanded chamber 6 and a variation in the velocity of exhaust pulsating wave to improve engine output in the medium-speed operation range.

In the low-speed operation range, both the changeover control valves 10, 11 are set slightly open which enables substantial deadening of exhaust noise.

Thus controlling the opening of the control valve 4 and both the changeover control valves 10, 11 can improve the output of the two-cycle engine E and at the same time can deaden exhaust sound within the low-speed operation range. However, the servomotor 14 for driving the control valve 4, and the servo motor 18 for driving both the changeover control valves 10, 11, are controlled by the single central processor 20, not only enabling cost reduction but facilitating adjustment operation because only the single central processor 20 requires adjustment.

Figure 8:
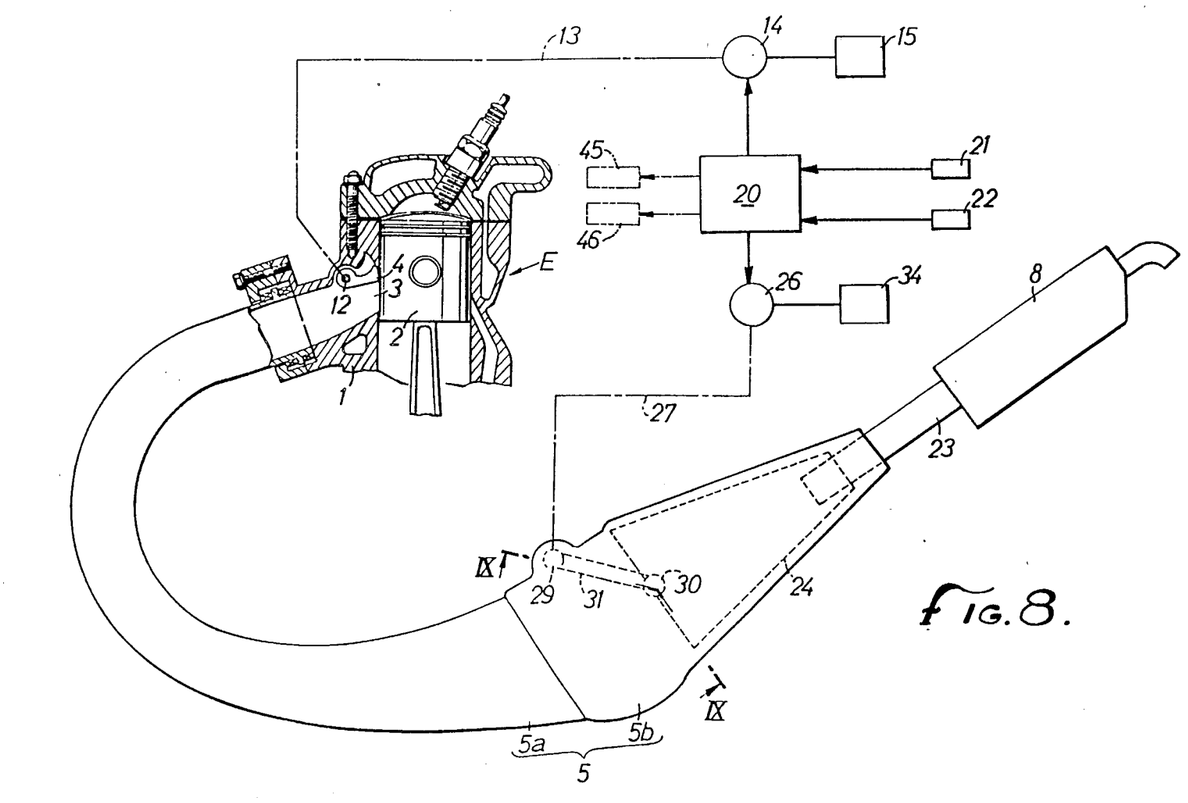
FIG. 8 is a schematic view of a second embodiment of the present engine control apparatus.
Figure 9:
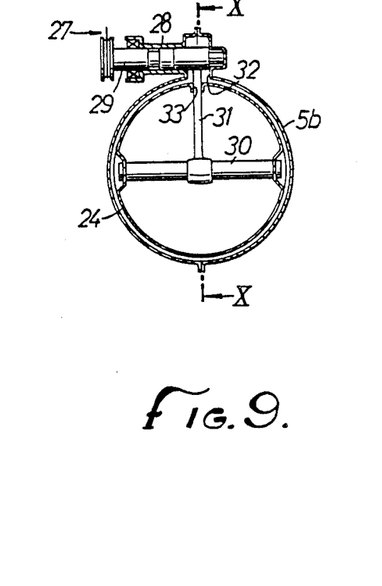
FIG. 9 is a section view taken along line IX—IX of FIG. 8.
Figure 10:
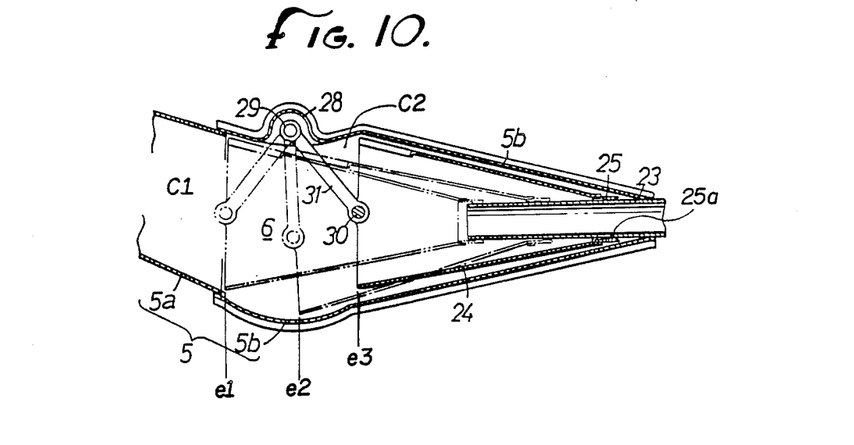
FIG. 10 is a section view taking along line X—X of FIG. 9.

FIGS. 8, 9 and 10 show a second embodiment of the present invention. As illustrated therein communicating pipe 23 is fitted and secured to the small-diameter end, or the downstream end, of the second pipe section 5b of the exhaust pipe. The other end of this communicating pipe 23 is connected to the muffler 8. In the second pipe section 5b, there is disposed a reflector 24 having a truncated cone or frustroconical shape as a control operation means for reflecting a positive pressure wave produced by the exhaust toward the exhaust port 3. The reflector 24 is disposed in the second exhaust pipe section 5b with its larger-diameter end on the first pipe section 5a side, and with a collar 25 fitted in the small-diameter end of the reflective pipe 24 slidably fitted on the outer periphery of the communicating pipe 23. The inner peripheral surface of the collar 25 is formed with an arcuate protuberance 25a which is in sliding contact with the pipe 23.

A servo motor 26 is connected to the reflector 24 as a driving source whose operation is controlled by the central processor 20, through a power transmission mechanism 27. Specifically, in the second pipe section 5b, a drive shaft 29 is rotatably supported on a bearing 28 which is mounted at the upper outer surface of its larger-diameter end. The drive shaft 29 and a driven shaft 30 mounted at the larger-diameter end of the reflector 24 are connected by a connecting rod 31. The power transmission mechanism 27 is connected to the drive shaft 29. To allow the rocking of the connecting rod 31, an elongated hole or slot 32 and a cutout 33 extend in the upper part of the larger-diameter end of the second pipe section 5b and the reflector 24 along the communicating pipe 23.

The servo motor 26 is proved with a potentiometer 34, which detects the position of the reflector pipe 24 and the amount of rotation of the drive shaft 29. The detected amount is inputted into the central processor 20.

Figure 11:
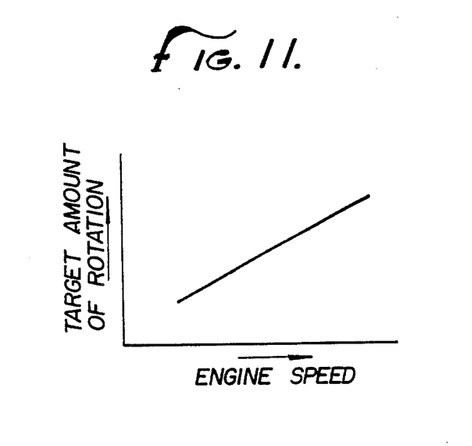
FIG. 11 is a graph illustrating the target amount of rotation of the drive shaft of FIG. 8.

The central processor 20, as in the first embodiment described above, controls the amount of opening of the control valve 4 as well as the position of the reflector pipe 24 in accordance with the engine speed. In the central processor 20, the target amount of rotation of the drive shaft 29 is set to drive the reflector 24 in the direction in which the volume of the expanded chamber 6 proportionally increases in accordance with the engine speed as shown in FIG. 11.

Figure 12:
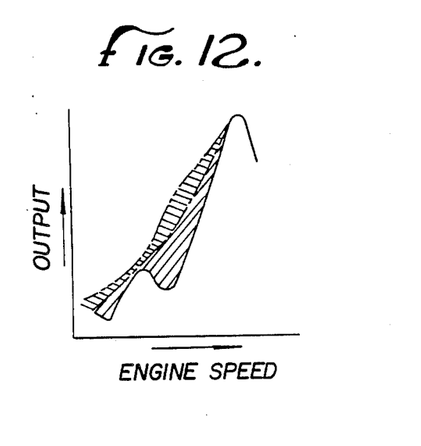
FIG. 12 is a graph of engine output characteristics.
Figure 13:
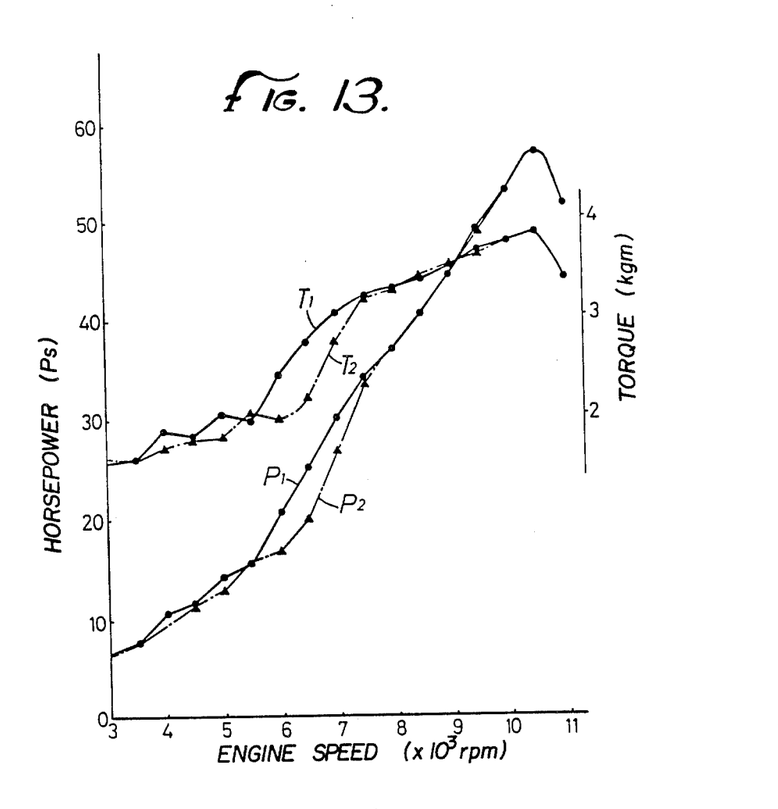
FIG. 13 is a graph illustrating engine horsepower and torque obtained with the present invention in comparison to the prior art.

According to this second amendment, the output of the two-cycle engine E increases as shown in FIG. 12. That is, controlling the opening and closing of the control valve 4 can increase the engine output as indicated by the leftward descending oblique lines. Similarly, controlling the travel of the reflector 24 can improve the output in the low and medium speed operation ranges as indicated by the rightward descending oblique lines. Besides, as the servo motor 14 of the control valve 4 and the servo motor 268 of the reflector 24 are controlled by the common central processor 20, cost reduction and facilitation of adjustment operation can be realized as in the case of the first embodiment. In FIG. 13, lines P1 and T1 represent engine characteristics according to the present invention and correspond to horsepower and torque, respectively. Lines P2 and T2 represent engine characteristics according to the prior art and correspond to horsepower and torque, respectively.

Figure 14:
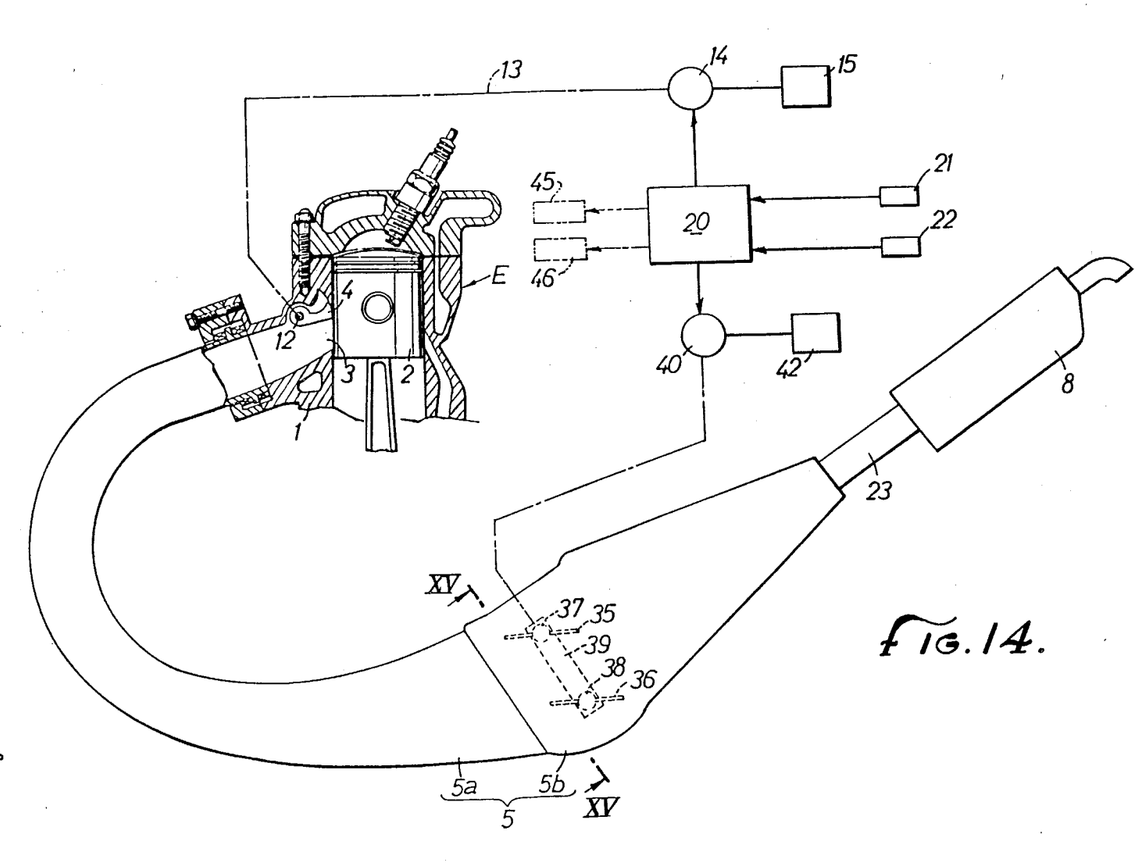
FIG. 14 is a schematic view of a third embodiment of the present engine control apparatus.
Figure 15:
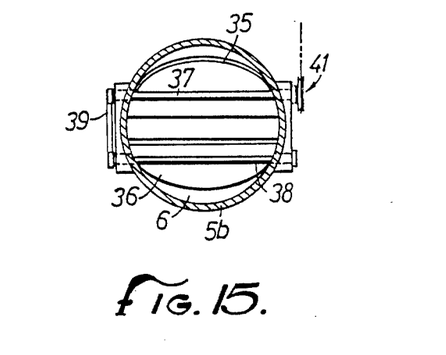
FIG. 15 is a section view taken along line XV—XV of FIG. 14.

FIGS. 14 and 15 show a third embodiment of the present invention. In the second pipe section 5b of the exhaust pipe 5 ar disposed a pair of openable and closable on-off valves 35, 36 as control operating means. These on-off valves 35, 36 are each formed nearly semicircular so that they will be nearly circular when closed, and are fixed on drive shafts 37, 38 that are rotatably and parallelly pivoted in the second pipe section 5b. In addition, both the drive shafts 37, 38 are connected through a link mechanism 39, such that both the drive shafts 37, 38 and the on-off valves 35, 36, are mechanically interlocked to open and close. The servo motor 40 which is a driving source to drive these drive shafts 37, 38 is coupled with the drive shaft 37 through the power transmission mechanism 41. The servo motor 40 is provided with a potentiometer 42.

Figure 16:
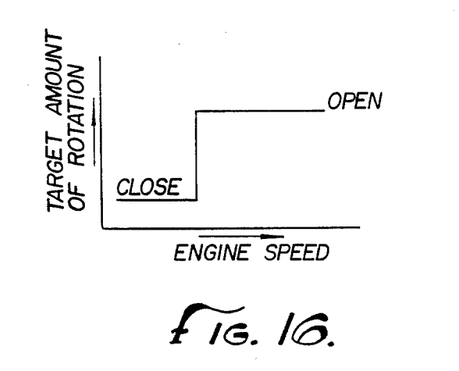
FIG. 16 is a graph illustrating the target amount of rotation of the drive shaft of the valves of FIG. 15.

The aforementioned servo motor 40 is controlled by the central processor 20 which controls the opening of the control valve 4. The detected amount from the potentiometer 42 is also input into the central processor 20. In the central processor 20, the target amount of rotation of the drive shafts 37, 38 is set as shown in FIG. 16, to control the operation of both the on-off valves 35, 36 in accordance with the engine speed. When the engine is running at a low speed to a certain fixed speed of revolution, the on-off valves 35, 36 are closed, and when the above-mentioned fixed speed of revolution is exceeded, both the on-off valves 35, 36 are opened.

Figure 17:
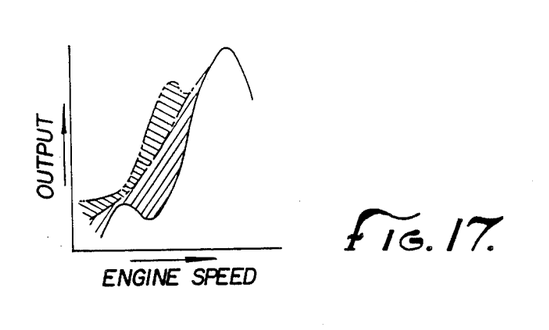
FIG. 17 is a graph of engine output characteristics.

According to this third embodiment, the output of the two-cycle engine E increases as shown in FIG. 17. Controlling the opening and closing operation of the control valve 4 can increase output as indicated by the leftward descending oblique lines, and controlling the opening and closing operation of the on-off valves 35, 36 can increase output in the low- and medium-speed operation ranges as indicated by the rightward descending oblique lines.

In addition, as the control valve 4 and the on-off valves 35, 36 are controlled by the central processor 20 as in the case of the first and second embodiments described above, cost reduction and simplification of adjustment operation can be realized.

As another embodiment of the present invention, the control valve 4 and a carburetor 45 or an oil pump 46 may be controlled by the central processor 20 as indicated by phantom lines in FIGS. 1, 8, and 14.

While embodiments and applications of this invention have been shown and described, it would be apparent to those skilled in the art that many more modifications are possible without departing from the inventive concepts herein. The invention, therefore, is not be restricted except in the spirit of the appended claims.

What is claimed is:

1. An engine control apparatus for controlling a two-cycle internal combustion engine having at least one cylinder with an exhaust port connected to an exhaust pipe comprising:
    a pivotally mounted exhaust control valve disposed adjacent to the exhaust port, said exhaust valve reversably pivotable partially into the exhaust port to control engine exhaust timing;
    a first servo motor mechanically linked to said exhaust valve for selectively pivoting said exhaust valve into a desired position in said exhaust port;
    means for timing pressure pulses in the exhaust pipe comprising a frustro-conical reflector disposed within said exhaust pipe, said reflector having a larger end facing oncoming exhaust gas flow, and said reflector axially displaceable within the exhaust pipe;
    a second servo motor mechanically linked to said reflector for selectively positioning said reflector within the exhaust pipe to adjust timing of exhaust pressure pulses; and
    a controller connected to said first and second servo motors, said controller receiving at least engine speed and throttle opening information and controlling said first and second servo motors to position said exhaust valve and said reflector, respectively, to desired positions based at least in part on the engine speed and throttle opening information.

2. The apparatus of claim 1 further comprising a potentiometer connected to at least one of said first and second servo motors for detecting servo motor position.

3. The apparatus of claim 1 wherein at least one of said first and second servo motors is connected to a pulley and a drive belt.

4. An engine control apparatus for controlling a two-cycle internal combustion engine having at least one cylinder with an exhaust port connected to an exhaust pipe comprising:
    a pivotally mounted exhaust control valve disposed adjacent to the exhaust port, said exhaust valve reversably pivotable partially into the exhaust port to control exhaust timing;
    a first servo motor mechanically linked to said exhaust valve for selectively pivoting said exhaust control valve into a desired position in said exhaust port;
    means for timing pressure pulses in the exhaust pipe comprising a pair of openable and closable on-off valves, each on-off valve disposed within the exhaust pipe and mounted on interlocked adjacent parallel pivotable shafts such that with said on-off valves in a closed position, the exhaust pipe is substantially entirely closed off;
    a second servo motor mechanically linked to said pivotable shafts for selectively positioning said on-off valves within the exhaust pipe to adjust exhaust pressure pulses; and
    a controller connected to said first and second servo motors, said controller receiving at least engine speed and throttle opening information and controlling said first and second servo motors to position said exhaust valve and said on-off valves to desired positions based at least in part on the engine speed and throttle opening information.

5. An engine controller comprising:
    a plurality of control operating means for controlling engine parameters, each including a driving source;

and a single central processor operatively connected to said driving source of each control operating means, with at least one of said control operating means disposed within an exhaust system of a two-cycle internal combustion engine;

said exhaust system comprising a main exhaust pipe and a sub exhaust pipe arranged in parallel with said main exhaust pipe with one of said control operating means comprising valves disposed within said main and sub exhaust pipes for controlling timing of exhaust gas pulsations in said exhaust system.

6. An engine control apparatus for controlling an internal combustion engine having at least one cylinder with an exhaust port and an exhaust system extending from said exhaust port comprising:

a main exhaust pipe linked to the exhaust port;

a sub exhaust pipe joined in parallel with said main exhaust pipe;

an exhaust control valve disposed adjacent to the exhaust port for adjusting exhaust timing;

means for timing pressure pulses in the exhaust system to selectively occur at the exhaust port comprising a first valve positioned in said main exhaust pipe, and a second valve positioned in said sub exhaust pipe with first and second valves mounted on a common shaft; and a controller linked to and controlling the operation of both said exhaust control valve and said means for timing pressure pulses, based upon detected operating parameters of the engine.

7. An engine controller for controlling a two-cycle internal combustion engine including at least one cylinder having an exhaust port connected to an exhaust pipe comprising:

a pair of valves which may be opened and closed for timing pressure pulses in the exhaust pipe, said pair of valves disposed within the exhaust pipe and mounted on adjacent pivotable shafts mechanically linked to rotate together such that with said pair of valves in a closed position, the exhaust pipe is substantially entirely closed off; and a shafts servo motor mechanically linked to each of said shafts for selectively positioning said valves within the exhaust pipe to adjust exhaust pressure pulses.

8. The engine controller of claim 7 further comprising an exhaust control valve disposed adjacent to the exhaust port and reversibly pivotable at least partially into the exhaust port to control exhaust timing; and an exhaust valve servo motor mechanically linked to the exhaust control valve for selectively pivoting said exhaust control valve into a desired position in the exhaust port.

9. The engine controller of claim 7 further comprising a controller unit connected to said shafts servo motor, said controller unit receiving and controlling said pair of valves to desired positions based at least in part on at least engine speed and throttle opening information.

10. An engine controller for controlling a two-cycle internal combustion engine including at least one cylinder having an exhaust port connected to an exhaust pipe comprising:

a frustro-conical reflector having a larger end and a smaller end and disposed within said exhaust pipe with said larger end facing oncoming exhaust gas flow;

a connecting rod pivotally supporting said reflector within said exhaust pipe with said reflector remaining spaced apart from said exhaust pipe to allow a swingable axial and transverse displacement of said reflector through pivotal movement of said connecting rod; and a servo motor mechanically linked to said connecting rod for selectively positioning said reflector within the exhaust pipe to adjust timing of exhaust pressure pulses.

11. The engine controller of claim 10 further comprising an exhaust control valve disposed adjacent to the exhaust port and reversibly pivotable at least partially into the exhaust port to control engine exhaust timing; and an exhaust valve servo motor mechanically linked to said exhaust valve for selectively pivoting said exhaust valve into a desired position in the exhaust port.

12. The engine controller of claim 10 further comprising a controller unit connected to said shafts servo motor, said controller unit receiving and controlling said shafts servo motor to position said reflector to desired positions based at least in part on at least engine and throttle opening information.

13. The engine controller of claim 10 wherein said connecting rod supports the larger end of said frustro-conical reflector.

14. The engine controller of claim 10 further comprising a slidable mount joining the smaller end of said frustro-conical reflector to said exhaust pipe.

15. The engine controller of claim 5 wherein said first and second valves are mounted at an angle with respect to each other an a single pivotable shaft.

16. The engine controller of claim 5 wherein one of said plurality of control operating means comprises an exhaust timing control valve disposed adjacent an exhaust port of a two cycle internal combustion engine and reversibly pivotable at least partially into the exhaust port to control exhaust timing.

* * * * *